C. E. BEACH.
SIGNALING SYSTEM.
APPLICATION FILED APR. 9, 1912.
1,084,059.
Patented Jan. 13, 1914.
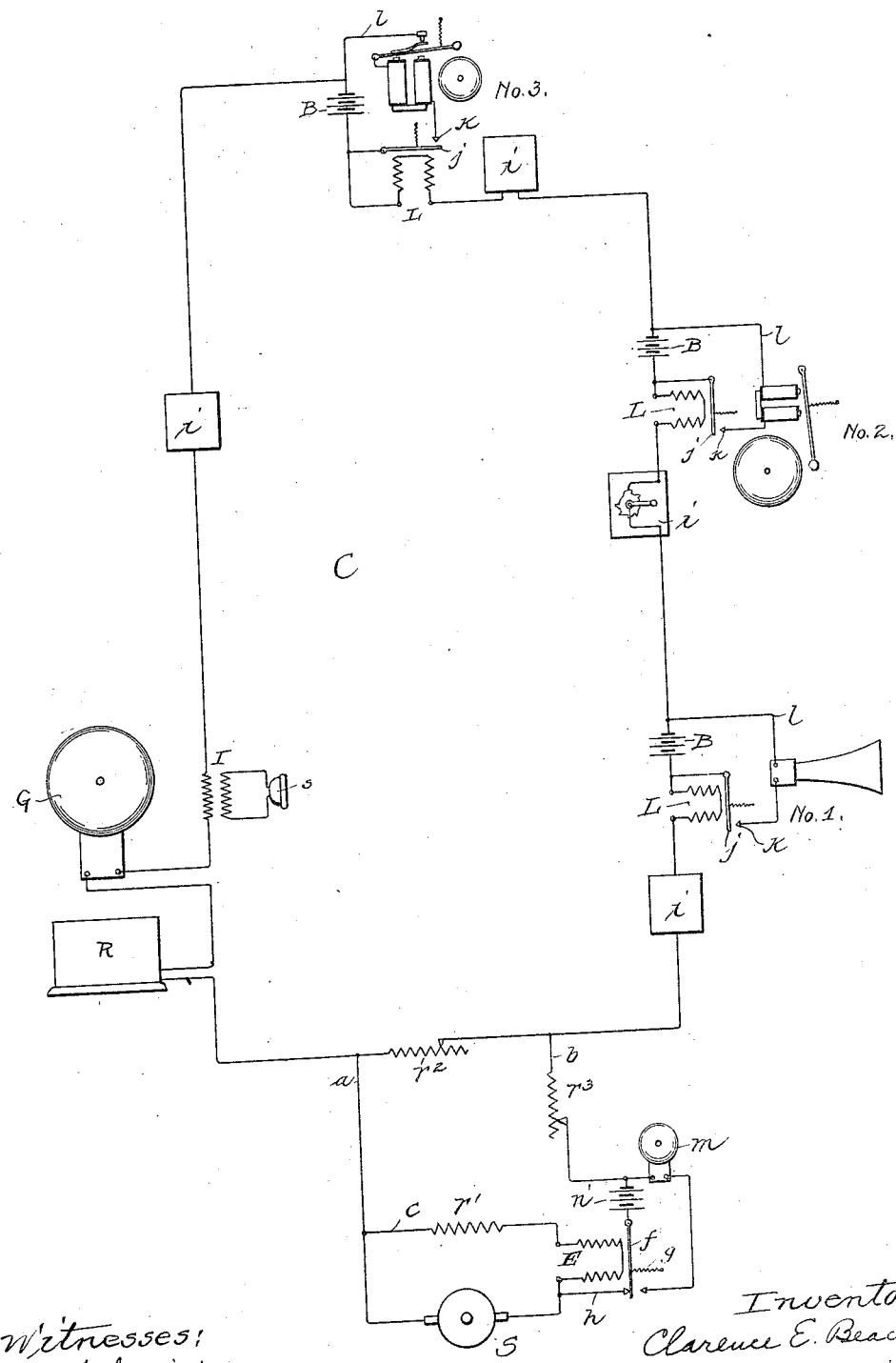
Witnesses:
C. J. Schmidt
S. N. Pond
Inventor
Clarence E. Beach
By Offield, Towle, Graves & Offield
Attys.

UNITED STATES PATENT OFFICE.

CLARENCE E. BEACH, OF BINGHAMTON, NEW YORK, ASSIGNOR TO GEORGE O. KNAPP, OF NEW YORK, N. Y.

SIGNALING SYSTEM.

1,084,059.  Specification of Letters Patent.  Patented Jan. 13, 1914.

Application filed April 9, 1912. Serial No. 689,549.

*To all whom it may concern:*

Be it known that I, CLARENCE E. BEACH, of Binghamton, county of Broome, State of New York, have invented new and useful Improvements in Signaling Systems, of which the following is a specification.

My invention relates, in general, to signaling systems and particularly to local alarm systems for use in buildings, such as factories. Alarm systems of this class usually include circuit controlling mechanisms and alarm and other signaling devices responsive to current interruptions. The circuit controlling mechanisms may be in the form of fire alarm boxes or of simpler construction, such as ordinary make and break mechanisms, or simple switches such as push buttons could be used.

One of the important objects of my invention is to provide a signaling circuit which can be connected with any available source of electrical energy capable of supplying a relatively small current flow constantly or at frequent intervals, such as an electric light or power circuit, primary batteries, or any other suitable source, and in which circuit individual storage batteries are provided for supplying a comparatively large current flow for controlling the operation of alarm mechanisms whenever the signaling circuit is interrupted; these storage batteries being included serially in the signaling circuit when the main source of current is operative, so as to be kept fully charged and in most fit condition to assume control of the associated alarm mechanisms should the main source become disconnected from the system.

Another important object of the invention is to include the windings of the various electro-magnetic local alarm controlling mechanisms serially in circuit with the main source and the local storage batteries and to provide circuit adjusting mechanisms to adjust the circuit conditions that when the circuit is closed, the current flow from the main source through the local electro-magnet windings and storage batteries will be of the proper value to most efficiently hold the local electro-magnet mechanisms in attracted position and to efficiently charge the local storage batteries; to provide circuit adjusting mechanisms and circuit controlling mechanisms in connection with the main source so that the main source will be automatically connected with the signaling circuit only when the pressure and current flow conditions of the main source are sufficient to keep the local electro-magnet devices efficiently attracted and to efficiently overcome the combined electro-motive forces of the local batteries to efficiently charge the same; to provide a shunt path for maintaining closure of the signaling circuit independently of the main source when such source is disconnected from service, and to provide such shunt path with resistance mechanisms so that when the main source is disconnected substantially the same circuit conditions will be maintained through the signaling mechanisms as when the main source was connected, the local storage batteries then operating to supply the current flow for the signaling circuits to maintain attracted position of the various electro-magnet devices; and, in general, to provide a system of this class which is of simple arrangement, which is automatic in its operation and which does not require constant supervision.

In the accompanying drawing, I have diagrammatically illustrated a system incorporating all the various features of my invention.

The main line leads $a$ and $b$ may connect with any main source of current S which may be a dynamo or motor-generator or any kind of battery, or these leads may connect directly with a public supply circuit. Bridged across the leads $a$ and $b$ is a circuit $c$ including the winding of an electro-magnetic device E, the armature $f$ of this device being retracted by a spring $g$ and when attracted, being brought into engagement with the conductor $h$ connected with the lead $b$. The signaling circuit C includes any number of local signaling mechanisms. Any number of circuit controlling devices $i$ may be included serially in the circuit and these devices could be in the form of regular fire alarm boxes or could be of any construction which will enable the circuit to be opened and closed. The circuit C may also serially include the windings of any number of local electro-magnetic devices L, and local storage batteries B, each associated with one of the electro-magnetic devices. The armature $i$ of each electro-magnetic device connects with one pole of the associated storage battery and the contact $k$ for the armature connects through conductor $l$ with the opposite pole of the associated battery and this conductor $l$ may include any alarm sounding device. At station No. 1, this alarm sounding device is in the form of a horn, while at station No. 2 the alarm device is shown in the form of a striker gong, and at station No. 3 the alarm device is shown in the form of a vibrating bell.

With the above arrangement if the source of current is in operative connection with the leads $a$ and $b$, and the armature $f$ of the electro-magnetic device E is attracted, current will flow serially through the circuit C and through the windings of the local electro-magnet devices L and the local storage batteries. The local storage batteries are cumulatively arranged in the circuit C and the electro-motive force of the source S is such as to overcome the resistance of the circuit C and the combined electro-motive force of all the storage batteries so that enough current will flow through the batteries to efficiently charge them, and at the same time to efficiently hold the local electro-magnet devices in attracted position. It is desirable that the main source shall not become connected with the circuit C until it will have sufficient strength to properly control the circuit. For this purpose the resistance of the circuit $c$ is such that the electro-magnetic device E will not become attracted until the main source is of sufficient strength to properly assume control, and if the resistance of the winding of the electro-magnetic device E is not sufficient, an additional resistance $r'$ may be included in the circuit $c$. Now when the source S becomes of sufficient strength the armature $f$ will be attracted and the circuit C will be connected with the source and will receive current flow therefrom and the local electro-magnets will be held in attracted position, and the local storage batteries will be charged. If now, any of the devices $i$ in circuit C are actuated the main current flow will be interrupted at each opening of the circuit and the local electro-magnetic devices will release their armatures to close the local circuits through the alarm devices, and the local storage batteries will supply sufficient current to cause the operation of the local alarm devices regardless of the relation to the normal current flow through circuit C of the current flow needed to cause operation of the devices. Upon closures of the circuit, the armatures of the local devices are again attracted by the main current and the local alarm circuits are opened.

It may happen that the main source is available only for a portion of the time, or it may become accidentally disabled, or it may be desirable to temporarily disconnect the main source, and in order to keep the circuit C intact and operative during such conditions, a resistance $r^2$ is bridged across the conductors $a$ and $b$ at a point between the local circuit C and the source so that the circuit C will be kept closed independently of the main source. With this arrangement, if the main source accidentally becomes disconnected or is purposely disconnected, the local storage batteries assume full control of the circuit C. If the circuit, during such conditions, is opened and closed at any of the devices $i$ the local electro-magnetic devices will alternately cause closing and opening of their alarm device circuits so that the storage batteries will alternately maintain attracted condition of the electro-magnetic devices, and will supply energy for the local alarm circuits when the electro-magnetic devices retract during opening of the circuit. The resistance $r^2$ should be such that upon disconnection of the main source substantially the same current flow will be maintained in the circuit C as when the main source was connected therewith. This resistance may be adjustable so that compensation can be made when additional local alarm devices are included. In case the voltage of the main source is such as would cause excessive current flow in circuit C if connected directly therewith, a resistance $r^3$ can be associated with the main source circuit to prevent such excessive flow. This resistance $r^3$ may be adjustable so that compensation can be made as additional local devices are included in the circuit C.

An indicating mechanism $m$ can be provided for indicating or giving warning when the main source is disconnected. This mechanism may be in the form of a bell or other device, and is preferably so connected that when the armature $f$ is retracted such device will be operated by current from local storage battery $n$. This storage battery is preferably so connected with the main source S, that it will be charged during the time the main source is in operative connection with the system.

At some central location, general alarm mechanism G and register mechanism R may be installed and included serially in circuit C to sound the general alarm and to make a record thereof. Means may also be provided for giving immediate indication whenever an opening occurs in circuit C between the points of connection with circuit C of the armature *j* and conductor *l* at any local alarm station. If this should happen at any station the armature would fall back and would then rapidly vibrate against its contact *k*. I therefore include in the circuit C some device responsive to such vibrations and as shown the primary winding of an induction coil I is included serially in the circuit and a receiver *s* is included in circuit with the secondary winding, the receiver responding to the rapid vibrations to thus give audible indication of the defect in circuit C.

I thus provide a signaling or alarm system of simple and efficient arrangement, in which local batteries are provided for supplying a comparatively large current flow for actuating electro-magnetic alarm devices singly, or in groups when needed, and said local batteries are so connected in the main signaling circuit that they are constantly under test, without thereby tending to discharge or to become exhausted. Such local batteries may be of the storage type so that the passage of the normal signaling line current may keep them fully charged, and in the event of failure or disconnection of the source of main signaling line current, these local batteries will supply current for the main signaling circuit and will maintain the signaling service both in the main signaling circuit and in the local circuits.

I do not, of course, desire to be limited to the precise arrangement shown and described as changes and modifications are possible which will still come within the scope of the invention and I, therefore claim the following:—

1. In a signaling system, the combination of a main circuit extending through a number of stations, a source of current at each station, a local circuit at each station, an electro-magnet at each station for controlling the local circuit thereat, said sources of current and the electro-magnet windings being included in series with each other in said main circuit, said sources acting together when said main circuit is closed to supply energizing current to maintain energization of said electro-magnets, and said sources acting individually to supply current for the associated local circuits when said main circuit is open.

2. In a signaling system, the combination of a main circuit extending to a plurality of stations, a storage battery at each station, a local signaling circuit at each station, an electro-magnet at each station for controlling the local circuit thereat, said storage batteries acting together when said main circuit is closed to supply current flow therefor and for the electro-magnets, and acting independently to supply current for the associated local circuits when the main circuit is open, and a charging current source connected to supply charging current for said storage batteries when the main circuit is closed and disconnected from said batteries when said main circuit is open.

3. In a signaling system, the combination of a main circuit extending to a plurality of stations, a storage battery at each station, a local signaling circuit at each station, an electro-magnet at each station for controlling the local circuit thereat, said storage batteries acting together when said main circuit is closed to supply current flow therefor and for the electro-magnets, and acting independently to supply current for the associated local circuits when the main circuit is open, and a main current source connected with said main circuit upon closure thereof to send current through said main circuit to charge said storage batteries and to energize said electro-magnets to hold the local circuits in normal condition, opening of said main circuit causing cessation of charging current flow through the batteries and control of the local circuits by said batteries.

4. In a signaling system, a closed signaling circuit having a plurality of local stations, an electro-magnet at each station having its winding included serially in said signaling circuit, a storage battery at each station included serially in said signaling circuit, a local circuit at each station including the battery thereat and controlled by the station electro-magnet, means for opening said main circuit, and a main source of current adapted for connection with said signaling circuit to supply current thereto for charging said batteries.

5. In a signaling system the combination of a normally closed main circuit having a number of stations, a source of current at each station, the various sources being connected cumulatively in said circuit, an electro-magnet at each station having a winding included serially in said main circuit and having an armature, a local circuit at each station bridged about the source thereat and controlled by the station armature, a signaling device in each local circuit, and means at various points for opening said main circuit, said sources normally supplying current flow for said main circuit to maintain energization of the various electro-magnets to thereby keep the various armatures attracted and the local circuits open, and said sources acting locally when the main circuit is opened to supply local current for the local circuits when said circuits are closed upon retraction of their controlling armatures.

6. In a signaling system a closed signaling circuit having a plurality of local stations, an electro-magnet at each station having its winding included serially in said signaling circuit, a storage battery at each station included serially in said signaling circuit, a local circuit at each station bridging the battery thereat and controlled by the station electro-magnet, means for opening said main circuit, and a main source of current adapted for connection with said signaling circuit to supply current thereto for charging said batteries.

7. In a signaling system a normally closed signaling circuit, a plurality of storage batteries serially included in said circuit, a local circuit in bridge relation with each storage battery, a plurality of electro-magnets having their windings serially included in said signaling circuit and each controlling one of said local circuits, and a main source of current adapted for connection with said signaling circuit to charge the storage batteries therein when said signaling circuit is closed, said storage batteries acting cumulatively to supply a current flow for said signaling circuit when said main source is disconnected therefrom and said batteries acting locally to supply current for the local circuits when said signaling circuit is opened.

8. In a signaling system the combination of a normally closed signaling circuit having a number of local stations, a storage battery at each station of comparatively large current capacity, an electro-magnet at each station having a winding included serially in said signaling circuit and having an armature, a local circuit at each station in bridge relation with the station storage battery and controlled by the station armature, a main source adapted for connection with said signaling circuit to send current flow serially therethrough, said main source being adapted to deliver a small current flow to the main line at a pressure sufficiently in excess of the combined electro-motive forces of said storage batteries whereby said storage batteries will be charged when the signaling circuit is closed, said storage batteries acting cumulatively to supply current flow for the signaling circuit when said circuit is closed and the main source disconnected therefrom, and said storage batteries acting individually to supply comparatively large current flow to the local circuits when said signaling circuit is opened.

9. In a signaling system the combination of a normally closed signaling circuit, a storage battery in said circuit having comparatively large current capacity, an electro-magnet having its winding serially included in said circuit and having an armature, a local circuit bridged around said storage battery and controlled by said armature, a resistance serially included in said signaling circuit, a main source of current adapted to be bridged about said resistance, said main source being adapted to send a comparatively small current flow through the signaling circuit at a pressure sufficiently in excess of the storage battery pressure to cause charging of said storage battery when said signaling circuit is closed, and means for opening said signaling circuit to allow said storage battery to supply current to said local circuit.

10. In a signaling system the combination of a normally closed signaling circuit, a plurality of individual storage batteries serially and cumulatively included in said signaling circuit, an electro-magnet associated with each storage battery and having its winding included in said signaling circuit, an armature for each electro-magnet, a local circuit bridged about each storage battery and controlled by the armature of the associated electro-magnet, a resistance serially included in said signaling circuit, a main source of current adapted to be connected with said signaling circuit in bridge of said resistance, an electro-magnet device controlled by current flow from said main source to in turn control the connection of said source with the signaling circuit, the voltage of said main source being sufficient to overcome the combined electro-motive forces of said storage batteries whereby said batteries will be charged when said signaling circuit is closed and the main source is in connection therewith, and means for opening said signaling circuit, opening of said signaling circuit causing deënergization of said electro-magnets to close the local circuits whereby said storage batteries may act individually to supply current to their local circuits, said storage batteries acting cumulatively to supply current flow to the signaling circuit and electro-magnets when said main source current is disconnected from the signaling circuit.

11. In a signaling system the combination of a normally closed signaling circuit, a source of current in said circuit, an electro-magnet having its winding included in said circuit and having an armature, a local circuit bridged about said source and controlled by said armature, means for opening said signaling circuit to cause deënergization of said electro-magnet and closure of the local circuit through said source, and means included in said signaling circuit for indicating an opening in said circuit between the points of connection therewith of said local circuit.

12. In a signaling system, the combination of a signaling circuit, a current supply source adapted when operating to close said signal circuit and to supply current flow therefor, a closure for said signaling circuit independent of said current source, local current sources arranged serially in said signaling circuit ineffective when said current supply source is operating and becoming effective to supply current flow for said circuit when said current supply source is not operating, and signaling mechanism connected with said signaling circuit.

13. In a signaling system, the combination of a signaling circuit, signaling mechanism connected with said signaling circuit, current sources arranged serially in said signaling circuit, a main current source, switch mechanism for connecting said main current source with said circuit, the current flow from said main source being in opposition to the current flow from said signaling circuit sources whereby said main current source controls said signaling mechanism when the main source is connected with said circuit, and a closure for said signaling circuit independent of said main source, said signaling circuit sources supplying current for said circuit upon disconnection of said main source.

14. In a signaling system, the combination of a signaling circuit, a plurality of storage batteries arranged serially in said signaling circuit, signaling mechanism connected with said signaling circuit, a main current source adapted for connection with said circuit to send current therethrough in opposition to said storage batteries whereby said storage batteries are charged and the signaling mechanism controlled by main current flow, and means for closing said circuit independently of said main source whereby said storage batteries may supply current flow for said circuit upon disconnection of said main source.

15. In a signaling system, the combination of a signaling circuit, signaling mechanism and a plurality of storage batteries arranged serially in said signaling circuit, a main current source adapted when operating to close said signaling circuit and to send current flow therethrough in opposition and in excess of the current flow from said storage batteries, and a shunt path about said main source for closing said circuit independent thereof whereby said storage batteries may supply current flow for said circuit when said main source is not operating.

16. In a signaling system, the combination of a signaling circuit, signaling mechanism and a local source of current for said circuit, a main source of current adapted for connection with said signaling circuit, a local current path for said main source connected in shunt thereof, electro-magnetic switch mechanism controlled by current flow through said local path to connect said main source with the signaling circuit as soon as the current flow from said source will be sufficient to overcome the current flow of said local source and to properly control the signaling mechanism of said signaling circuit, and a circuit path for closing said signaling circuit independently of said main source whereby said local source may supply current flow for said signaling circuit when said main source is not operating.

17. In a signaling system, a closed signaling circuit having a plurality of local stations, an electro-magnet at each station having its winding included serially in said signaling circuit, a storage battery at each station included serially in said signaling circuit, a local circuit at each station bridging the battery thereat and controlled by the station electro-magnet, means for opening said signaling circuit, a main source of current adapted for connection with said signaling circuit to supply current thereto for charging said batteries and means for indicating the failure of said main source.

18. In a signaling system, a signaling circuit, a main source of current supply adapted to close said signal circuit to supply current flow therefor, a closure for said signaling circuit independent of said main source, a plurality of local current sources arranged serially in said signaling circuit ineffective when said main source is operating and becoming effective to supply current flow for said circuit when said main source is not operating, means for indicating when said main source is not operating, and signaling mechanism connected with said signaling circuit.

19. In a signaling system, a signaling circuit, signaling mechanism and a plurality of storage batteries arranged serially in said signaling circuit, a main current source adapted to close said signaling circuit to send current flow therethrough in opposition to the current flow from said storage batteries, a shunt path about said main source for closing said circuit independent of said main source whereby said storage batteries may supply current flow for said circuit when said main source is not operating, and means for indicating when said main source is not operating.

20. In a signaling system, the combination of a main circuit, a primary source of current connected therewith, a secondary source of current in series with the main source and adapted to be charged thereby, an alarm mechanism in a normally open shunt to the secondary source and an electro-magnet in the main circuit for controlling said shunt circuit.

21. In a signaling system, the combination of a main circuit, a main or primary source of current connected therewith, a secondary source of current in series with the main source and adapted to be charged thereby, an alarm mechanism in a shunt to the secondary source, a circuit controller in said shunt and an electromagnet in the main circuit for operating said circuit controller and interrupting said shunt circuit while energized.

22. In a signaling system, the combination of a main circuit, a source of current connected therewith, storage batteries at different points in the main circuit, in series with the main source of current and adapted to be charged thereby, local alarm mechanism in a normally open shunt around each of said storage batteries, circuit controllers in said shunts and electromagnets in the main circuit for operating said circuit controllers.

23. In a signaling system, the combination of a normally closed main circuit having a number of stations, a primary source of current connected therewith, a secondary source of current at each station, all in series with the main source, a signaling device at each station included in a shunt to the secondary source at such station, an electromagnet at each station included serially in the main circuit and adapted to control the shunt circuit, and means at various points for interrupting said main circuit.

24. In a signaling system, the combination of a normally closed signaling circuit, a storage battery in said circuit, an electromagnet connected in said circuit, a local alarm circuit in shunt to said storage battery and controlled by said electromagnet, a resistance included serially in the signaling circuit, a main source of current connected to the signaling circuit and in parallel with said resistance, and means for controlling the connection of the source of current with the signaling circuit.

25. In a signaling system, the combination of a normally closed main or signaling circuit having a plurality of local stations, an electromagnet at each station included in the signaling circuit, a storage battery at each station included in the signaling circuit, a local circuit at each station shunting the storage battery at said station and controlled by the station electromagnet, means for interrupting the main circuit for purposes of signaling, a resistance included serially in the main circuit, a main source of current connected to the signaling circuit and in parallel with the resistance, and means for controlling the connection of said source of current with the main circuit.

26. In a signaling system, the combination of a normally closed main or signaling circuit having a plurality of local alarm stations, an electromagnet at each alarm station included in the signaling circuit, a storage battery at each station included in the signaling circuit, a local circuit at each station shunting the storage battery thereat and controlled by the station electromagnet, means for interrupting the main circuit for purposes of signaling, a main source of current connected to the signaling circuit, an electromagnet in shunt to said source and a circuit controller operated by said magnet for controlling the connection of the source of current with the signaling circuit.

27. In a signaling system comprising a normally closed main circuit, a main source of current, a secondary source of current in series therewith, a local alarm station and means for interrupting the circuit for purposes of signaling, the combination with the main circuit of a resistance connected serially therein and bridging the connections of the main source of current therewith, an electromagnet in shunt to the main source, a circuit controller operated thereby and adapted to make and break the connections of said main source with the main circuit.

28. In a signaling system comprising a normally closed main circuit, a main source of current, a secondary source of current in series therewith, a local alarm station and means for interrupting the circuit for purposes of signaling, the combination with the main circuit of a resistance connected serially thereto and bridging the connections of the main source of current therewith, an electromagnet in shunt to the main source, a storage battery in one of the connections between the source and the main circuit and a switch in series with said storage battery operated by said shunt magnet and adapted to control the connection of the source of current with the main circuit.

29. In a signaling system comprising a normally closed main circuit, a main source of current, a secondary source of current in series therewith, a local alarm station and means for interrupting the circuit for purposes of signaling, the combination with the main circuit of a resistance connected serially therein and bridging the connections of the main source of current therewith, an electromagnet in shunt to the main source, a storage battery in one of the connections between the source and the main circuit, a variable resistance and a switch in series with said storage battery, the said switch being operated by the said shunt magnet and adapted to control the connection of the main source of current with the signaling circuit.

30. In a signaling system comprising a normally closed main circuit, a main source of current, a secondary source of current in series therewith, a local alarm station and means for interrupting the circuit for purposes of signaling, the combination with the main circuit of a resistance connected serially therein and bridging the connections of the main source of current therewith, an electromagnet in shunt to the main source, a storage battery in one of the connections between the source and the main circuit, a switch in series with said storage battery operated by said electromagnet and adapted to control the connection of the main source with the signaling circuit, and a local alarm circuit controlled by said switch.

31. In a signaling system the combination with a normally closed signaling circuit, a main or primary source of current connected therewith, a secondary source of current in series with the main source, alarm mechanism in a shunt to the secondary source, a vibrating circuit controller in said shunt, an electromagnet in circuit with the main and secondary sources of current for operating said circuit controller, and a telephonic device operated by the main circuit and responsive to vibrations of the circuit controller.

In witness whereof, I hereunto subscribe my name, this 5th day of April A. D., 1912.

CLARENCE E. BEACH.

Witnesses:
HENRY W. STRONG,
CHARLES J. SCHMIDT.